United States Patent [19]
Linde et al.

[11] Patent Number: 4,819,880
[45] Date of Patent: Apr. 11, 1989

[54] MANURE SPREADER DRIVE SYSTEM

[75] Inventors: Gilbert W. Linde, Oxford; Loren G. Sadler, Stevens, both of Pa.

[73] Assignee: Ford New Holland, Inc., New Holland, Pa.

[21] Appl. No.: 647,945

[22] Filed: Sep. 5, 1984

[51] Int. Cl.⁴ .................. A01C 23/00; A01C 19/00
[52] U.S. Cl. ................... 239/662; 239/670; 239/677
[58] Field of Search ............... 239/661, 662, 670, 675, 239/677; 474/66

[56] References Cited

U.S. PATENT DOCUMENTS

| | | | |
|---|---|---|---|
| 3,252,249 | 9/1885 | Johnson | 239/677 |
| 4,467,967 | 8/1984 | Martin | 239/675 |
| 4,475,692 | 10/1984 | Walley | 239/662 |

FOREIGN PATENT DOCUMENTS

| | | | |
|---|---|---|---|
| 663873 | 5/1963 | Canada | 239/670 |
| 688394 | 3/1953 | United Kingdom | 239/675 |

Primary Examiner—Andres Kashnikow
Assistant Examiner—P. Burkhart
Attorney, Agent, or Firm—Darrell F. Marquette; Frank A. Seemar; Larry W. Miller

[57] ABSTRACT

In a manure spreader for handling slurry material, an auger is mounted in the bottom of a tank and an expeller is disposed at an opening in the tank to discharge material therefrom. A drive system is provided to rotate the auger and the expeller in different directions when the drive system is connected to a tractor PTO. the drive system includes a series of drive members such as chains and sprockets arranged and connected to cause rotation of the expeller in the same direction as the tractor PTO and rotation of the auger in the opposite direction at a substantially slower speed than the expeller.

12 Claims, 3 Drawing Sheets

ID=4,819,880

MANURE SPREADER DRIVE SYSTEM

BACKGROUND AND SUMMARY OF THE INVENTION

Manure spreaders for handling slurry material generally include a tank for containing material, an auger rotatably mounted in the bottom of the tank for moving material toward an opening formed in the tank, and an expeller disposed at the opening in the tank to discharge material in a lateral direction from the spreader. One prior manure spreader of this type disclosed in U.S. Pat. No. 4,362,272 includes a drive system consisting of a pair of gearboxes for rotating the auger and the expeller. It is an object of this invention to provide an improved manure spreader drive system that is more reliable and more economical than the drive system disclosed in U.S. Pat. No. 4,362,272.

The present invention provides a novel drive system for rotating the auger and the expeller in the type of manure spreader generally described above. In one embodiment, the drive system includes a shaft adapted for connection to a tractor PTO, first and second drive members mounted on the shaft for rotation in a first direction, a third drive member connected to the first drive member for rotation in the first direction, and a fourth drive member connected for rotation with the third drive member in the first direction. This embodiment of the drive system also includes a fifth drive member connected to the fourth drive member for rotation in a second direction which is opposite the first direction. The fifth drive member is connected to the auger to rotate the auger in the second direction, and means are also provided connecting the second drive member to the expeller to rotate the expeller in the first direction.

In another embodiment of the drive system of the present invention, the third drive member is connected to the first drive member for rotation in the second direction. The fourth drive member is connected for rotation with the third drive member in the second direction, and the fifth drive member is connected to the fourth drive member for rotation in the second direction. The fifth drive member is connected to the auger to rotate the auger in the second direction, and means are provided connecting the second drive member to the expeller to rotate the expeller in the first direction.

DESCRIPTION OF THE PREFERRED EMBODIMENTS

Figure 1:
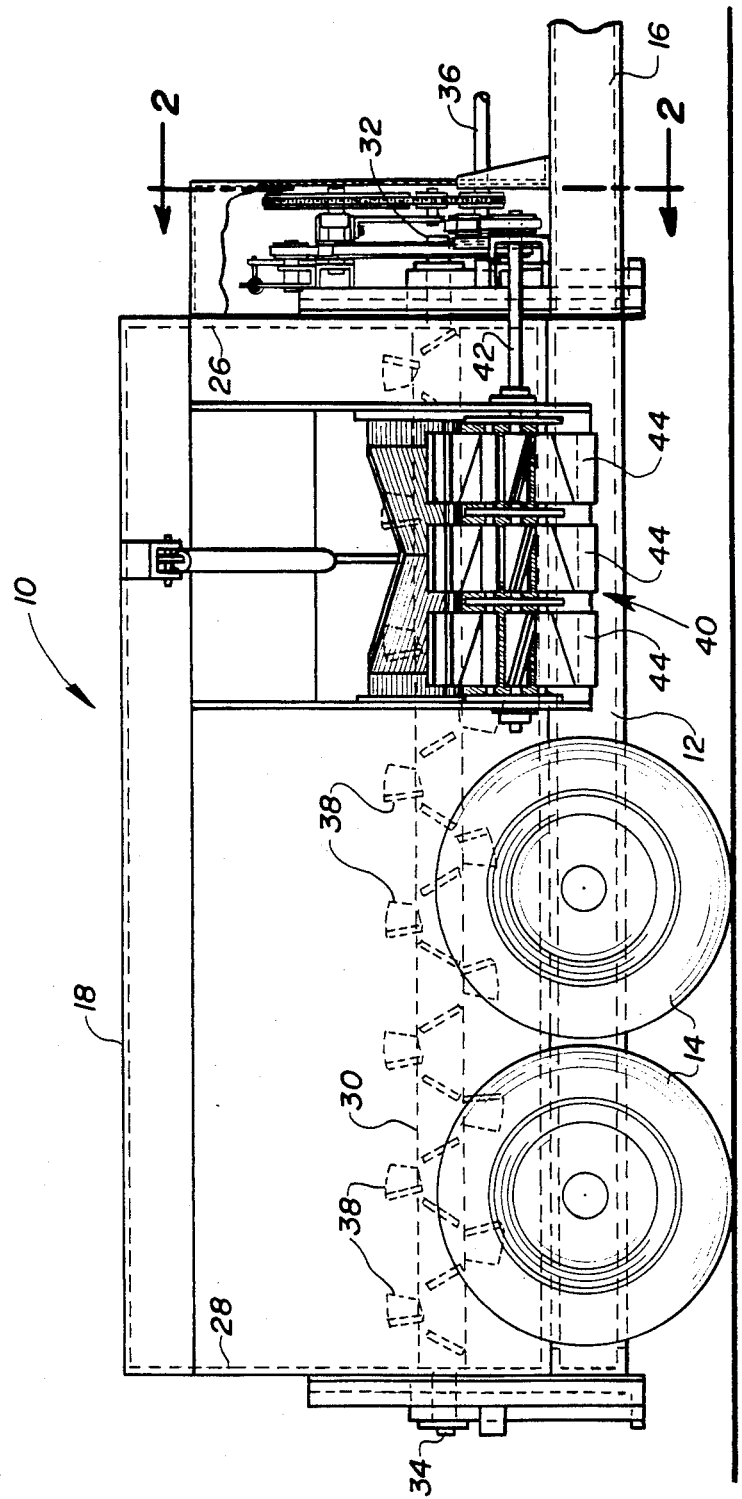
FIG. 1 is a side elevational view of a manure spreader incorporating one embodiment of the drive system of the present invention.
Figure 2:
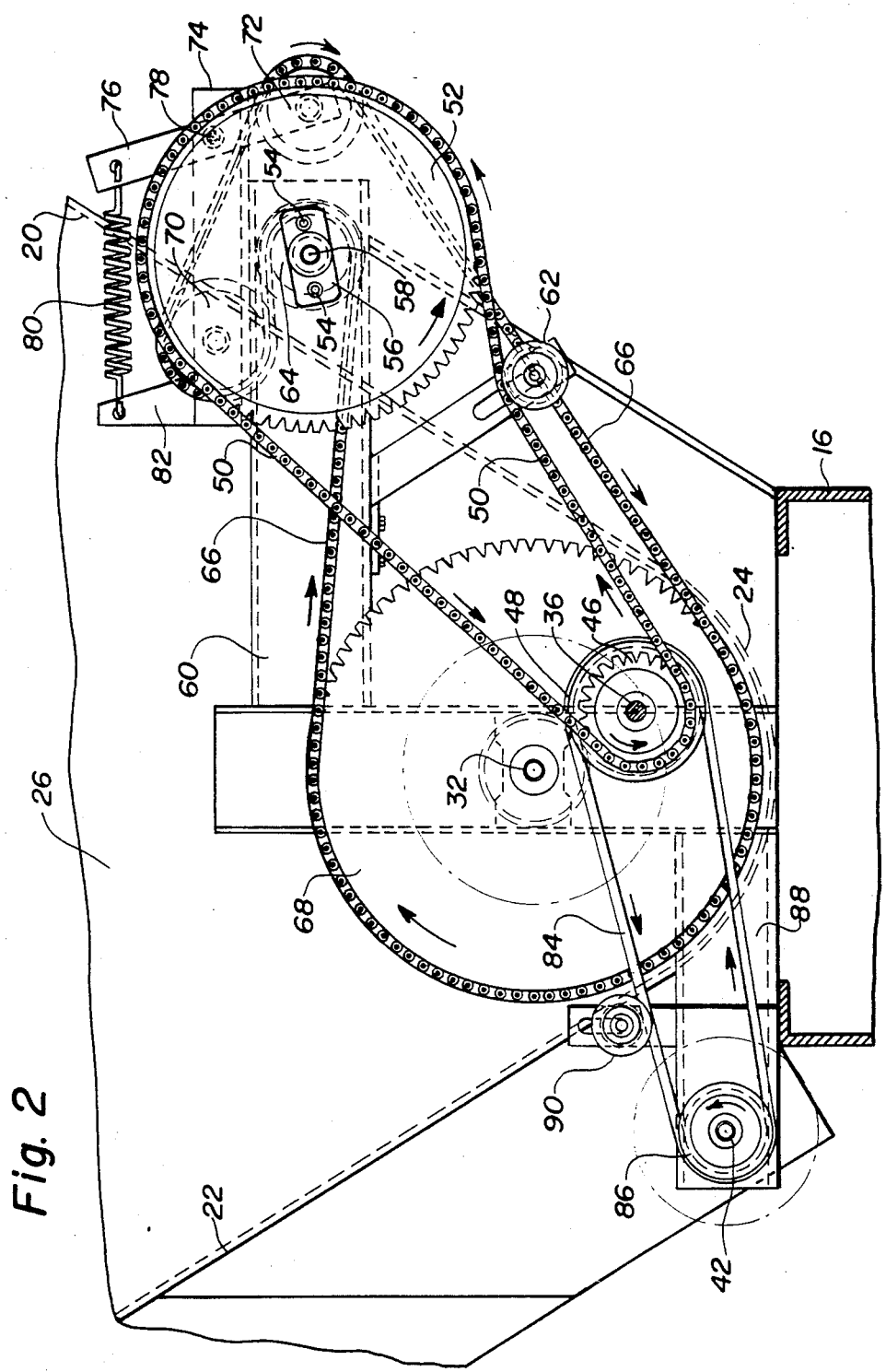
FIG. 2 is an enlarged sectional view of the embodiment of the drive system of FIG. 1 taken along lines 2—2 in FIG. 1.

Referring generally to FIG. 1, a manure spreader 10 includes a base frame 12 supported by wheels 14. A tongue 16, partially shown, is provided at the forward end of the base frame 12 and is adapted for connection to a towing vehicle such as a tractor (not shown). A tank 18 for containing manure is mounted on the base frame 12, and includes sidewalls 20,22 converging or sloping toward each other and merging into a bottom wall 24 as seen in FIG. 2. The tank 18 also has endwalls 26,28 disposed substantially parallel to each other.

An auger 30 is rotatably mounted in the bottom of the tank 18. The auger 30 has stub shafts 32,34 at its ends extending through and rotatably disposed in bearings carried on the endwalls 26,28 of the tank 18. Stub shaft 32 is driven in the manner described hereafter from a shaft 36 which is adapted for connection to the PTO of a tractor. The auger 30 includes paddles 38 arranged to move manure toward an opening formed in the sidewall 22 of the tank 18 when the auger 30 is rotated by the tractor PTO, and an expeller assembly 40 is provided at this opening in the tank sidewall 22 to discharge manure laterally away from the spreader 10. The expeller assembly 40 includes a central shaft 42 which is driven from the shaft 36 in the manner described hereafter. The expeller assembly 40 also includes a plurality of flails 44 pivotally mounted on further shafts which are connected to be rotated with and around the central shaft 42.

One embodiment of the drive system of the present invention is seen in FIG. 2, and includes a first drive member or sprocket 46 and a second drive member or sheave 48 both fixed on the shaft 36. The sprocket 46 is connected via a chain 50 to a third drive member or sprocket 52 which is of larger diameter than sprocket 46. Sprocket 52 is secured by a pair of shear bolts 54 to a plate 56 which in turn is fixed to a shaft 58 rotatably mounted on a support beam 60 carried on the base frame 12. An idler mechanism 62 is mounted on the support beam 60 to maintain tension in the chain 50. A fourth drive member or sprocket 64, of smaller diameter than sprocket 52, is fixed on the shaft 58 behind the sprocket 52.

The sprocket 64 is connected via a chain 66 in a back-wrap manner to a fifth drive member or sprocket 68 fixed to the stub shaft 32 of the auger 30. The chain 66 extends around idler sprockets 70 and 72. Idler sprocket 70 is stationarily mounted on a support beam 74 attached to the support beam 60. Idler sprocket 72 is carried on a lever 76 which is pivoted by a pin 78 on the support beam 74. A spring 80, connected between the lever 76 and a bracket 82 on the support beam 74, normally urges the lever 76 to rotate in a counterclockwise direction about pin 78 as viewed in FIG. 2 to maintain proper tension in the chain 66.

Sheave 48 is connected via a belt 84 to a sixth drive member or sheave 86 fixed to the central shaft 42 of the expeller assembly 40. The shaft 42 is rotatably mounted in a support beam 88 on the base frame 12, and an idler mechanism 90 is carried on the support beam 88 to maintain tension in the belt 84.

When the manure spreader 10 is connected to a tractor (not shown) for normal operation utilizing the embodiment of the drive system of FIG. 2, the sprocket 46 and the sheave 48 are driven in a counterclockwise direction by the shaft 36 as seen in FIG. 2. This causes concurrent counterclockwise rotation of the sprocket 52 and the sheave 86 via the chain 50 and the belt 84, respectively. The flails 44 of the expeller assembly 40 are thus rotated in a counterclockwise direction, as viewed from the front of the manure spreader 10, by the central shaft 42. The counterclockwise rotation of the sprocket 52 results in counterclockwise rotation of the sprocket 64 via the shaft 58 and clockwise rotation of the sprocket 68 via the chain 66. The sprocket 68 is rotated clockwise due to the chain 66 extending around the sprocket 64 in a backwrap manner. The auger 30 is thus rotated in a clockwise direction, as viewed from the front of the manure spreader 10, by the stub shaft 32 at a substantially slower speed than the flails 44 of the expeller assembly 40.

Figure 3:
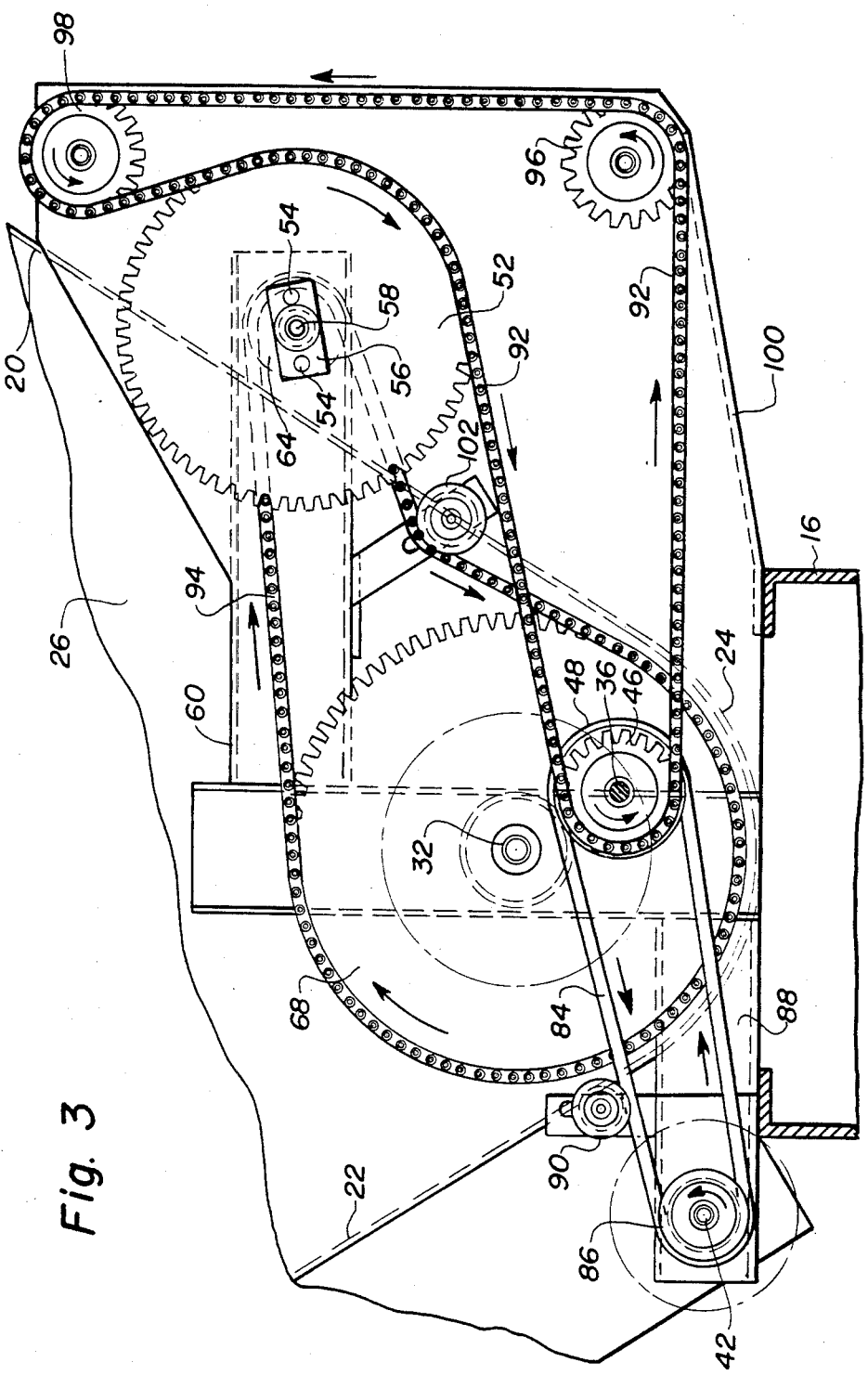
FIG. 3 is a view similar to FIG. 2 of another embodiment of the drive system of the present invention.

Another embodiment of the drive system of the present invention is seen in FIG. 3, and includes the same first, second, third, fourth, fifth and sixth drive members 46,48,52,64,68 and 86, respectively, that are also included in the embodiment of the drive system shown in FIG. 2. The main difference between the two embodiments of the drive system disclosed herein resides in that the chains 50 and 66 used in the embodiment of FIG. 2 are replaced by chains 92 and 94, respectively, in the embodiment of FIG. 3.

The chain 92 connects the third drive member or sprocket 52 in a backwrap manner to the first drive member or sprocket 46. The chain 92 also extends around idler sprockets 96 and 98, at least one of which may be adjustably mounted on plate 100 carried on the base frame 12 to maintain proper tension in the chain 92. The chain 94 connects the fourth drive member or sprocket 64 to the fifth drive member or sprocket 68, and an idler mechanism 102 is provided to maintain tension in the chain 94. Belt 84 connects the second drive member or sheave 48 to the sixth drive member or sheave 86 in the same manner as shown in FIG. 2.

During normal operation of the manure spreader 10 with the embodiment of the drive system of FIG. 3, the sprocket 52 is driven in a clockwise direction via the chain 92 as seen in FIG. 3 due to the chain 92 extending around the sprocket 52 in a backwrap manner. The sprocket 64 is rotated clockwise via the shaft 58, and the sprocket 68 is rotated clockwise via the chain 94. The sheave 86 is rotated counterclockwise via the belt 84. The auger 30 is rotated in a clockwise direction by the stub shaft 32 when viewed from the front of the manure spreader 10, and the expeller assembly flails 44 are rotated in a counterclockwise direction by the central shaft 42 when viewed from the front of the manure spreader 10 at a substantially faster speed than the auger 30.

The following claims are intended to cover all modifications and variations of the preferred embodiment of the drive system disclosed herein without departing from the spirit and scope of the invention.

Having thus described the invention, what is claimed is:

1. In a manure spreader having a tank for containing manure, an auger rotatably mounted in said tank for moving manure toward an opening formed in said tank, an expeller disposed at said opening to discharge manure from said tank, drive means for rotating said auger and said expeller, said drive means comprising:
   a shaft adapted for connection to the PTO of a tractor;
   first and second drive members mounted on said shaft for rotation in a first direction;
   a third drive member connected to said first drive member for rotation in said first direction;
   a fourth drive member connected for rotation with said third drive member in said first direction;
   a fifth drive member connected to said fourth drive member for rotation in a second direction which is opposite said first direction, said fifth drive member being connected to said auger to rotate said auger in said second direction; and
   means connecting said second drive member to said expeller to rotate said expeller in said first direction.

2. The drive means of claim 1, wherein said first and third drive members comprise sprockets connected by a chain.

3. The drive means of claim 2, wherein said fourth and fifth drive means comprise further sprockets connected by another chain, said another chain extending around said fourth drive member in a backwrap manner to cause rotation of said fifth drive member in said second direction.

4. The drive means of claim 3, further comprising a sixth drive member connected to said second drive member, said sixth drive member being connected to said expeller to rotate said expeller in said first direction.

5. The drive means of claim 4, wherein said second and sixth drive members comprise sheaves connected by a belt.

6. The drive means of claim 5, wherein said third and fourth drive members are mounted on another shaft that is separate from and spaced from said first-mentioned shaft.

7. In a manure spreader having a tank for containing manure, an auger rotatably mounted in said tank for moving manure toward an opening formed in said tank, an expeller disposed at said opening to discharge manure from said tank, drive means for rotating said auger and said expeller, said drive means comprising:
   a shaft adapted for connection to the PTO of a tractor;
   first and second drive members mounted on said shaft for rotation in a first direction;
   a third drive member connected to said first drive member for rotation in a second direction which is opposite said first direction;
   a fourth drive member connected for rotation with said third drive member in said second direction;
   a fifth drive member connected to said fourth drive member for rotation in said second direction, said fifth drive member being connected to said auger to rotate said auger in said second direction; and
   means connecting said second drive member to said expeller to rotate said expeller in said first direction.

8. The drive means of claim 7, wherein said first and third drive members comprise sprockets connected by a chain, said chain extending around said third drive member in a backwrap manner to cause rotation of said third drive member in said second direction.

9. The drive means of claim 8, wherein said fourth and fifth drive means comprise further sprockets connected by another chain.

10. The drive means of claim 9, further comprising a sixth drive member connected to said second drive member, said sixth drive member being connected to said expeller to rotate said expeller in said first direction.

11. The drive means of claim 10, wherein said second and sixth drive members comprise sheaves connected by a belt.

12. The drive means of claim 11, wherein said third and fourth drive members are mounted on another shaft that is separate from and spaced from said first-mentioned shaft.

* * * * *